(12) United States Patent
Osaki et al.

(10) Patent No.: US 8,469,134 B2
(45) Date of Patent: Jun. 25, 2013

(54) ENGINE STARTING CONTROLLER

(75) Inventors: Rie Osaki, Anjo (JP); Shouji Osaki, Okazaki (JP); Takashi Komura, Toyota (JP); Katsuyoshi Nishii, Okazaki (JP); Hirohiko Tatsumoto, Anjo (JP)

(73) Assignees: DENSO CORPORATION, Kariya-city (JP); Nippon Soken, Inc., Nishio-city (JP)

( * ) Notice: Subject to any disclaimer, the term of this patent is extended or adjusted under 35 U.S.C. 154(b) by 939 days.

(21) Appl. No.: 12/461,038

(22) Filed: Jul. 30, 2009

(65) Prior Publication Data
US 2010/0036592 A1 Feb. 11, 2010

(30) Foreign Application Priority Data

Aug. 7, 2008 (JP) .................. 2008-204187

(51) Int. Cl.
B60K 28/06 (2006.01)
B60R 25/00 (2006.01)
G06K 9/00 (2006.01)

(52) U.S. Cl.
USPC .......... 180/272; 180/287; 340/576; 340/5.83; 382/124; 701/113

(58) Field of Classification Search
USPC ................. 180/272, 273, 287; 340/576, 5.54, 340/5.83, 5.85; 382/124; 701/1, 36, 45, 113
See application file for complete search history.

(56) References Cited

U.S. PATENT DOCUMENTS

| | | | | |
|---|---|---|---|---|
| 5,041,810 A * | 8/1991 | Gotanda | ................. | 340/426.12 |
| 5,348,003 A * | 9/1994 | Caro | ............................ | 600/310 |
| 5,522,388 A * | 6/1996 | Ishikawa et al. | ............... | 600/322 |
| 5,743,349 A * | 4/1998 | Steinberg | ....................... | 180/272 |
| 5,813,989 A * | 9/1998 | Saitoh et al. | .................. | 600/484 |
| 6,229,908 B1 * | 5/2001 | Edmonds et al. | ............. | 382/124 |
| 6,239,707 B1 * | 5/2001 | Park | ............................. | 340/576 |

(Continued)

FOREIGN PATENT DOCUMENTS

| | | |
|---|---|---|
| JP | A-07-009924 | 1/1995 |
| JP | 07-88105 A | 4/1995 |

(Continued)

OTHER PUBLICATIONS

Notice of Rejection mailed on May 11, 2010 issued from the Japanese Patent Office in the corresponding Japanese patent application No. 2008-204187 (with English translation).

*Primary Examiner* — Toan To
*Assistant Examiner* — Laura Freedman
(74) *Attorney, Agent, or Firm* — Posz Law Group, PLC

(57) ABSTRACT

When a driver of a vehicle brings his/her detection part close to a case, a sensor detects a pulse of the driver at the detection part with an optical method, and takes an image of the detection part. An individual certification means determines whether the driver of the vehicle is an authorized person or not based on the image of the detection part taken by the sensor. An alcohol concentration determiner calculates an index value of a blood alcohol concentration of the driver based on the pulse detected at the detection part by the sensor, and determines whether the index value exceeds a criterial value of a drinking assessment. When it is determined that the driver of the vehicle is an authorized person and the index value does not exceed the criterial value of the drinking assessment, a permission means permits the driver to start an engine of the vehicle.

4 Claims, 12 Drawing Sheets

U.S. PATENT DOCUMENTS

| | | | |
|---|---|---|---|
| 6,748,301 B1 * | 6/2004 | Ryu | 701/1 |
| 6,885,439 B2 * | 4/2005 | Fujieda | 356/71 |
| 6,967,581 B2 * | 11/2005 | Karsten | 340/576 |
| 7,245,745 B2 * | 7/2007 | Nagasaka et al. | 382/115 |
| 7,280,041 B2 * | 10/2007 | Ryou | 340/539.12 |
| 7,386,152 B2 * | 6/2008 | Rowe et al. | 382/124 |
| 7,519,205 B2 * | 4/2009 | Chou | 382/124 |
| 7,812,712 B2 * | 10/2010 | White et al. | 340/426.2 |
| 7,873,408 B2 * | 1/2011 | Sato | 600/476 |
| 7,876,929 B2 * | 1/2011 | Matsumura et al. | 382/115 |
| 8,095,193 B2 * | 1/2012 | Ridder et al. | 600/310 |
| 8,297,399 B2 * | 10/2012 | Goi | 180/272 |
| 8,306,595 B2 * | 11/2012 | Osaki et al. | 600/322 |
| 2002/0183627 A1 | 12/2002 | Nishii et al. | |
| 2003/0090650 A1 | 5/2003 | Fujieda | |
| 2008/0223646 A1 * | 9/2008 | White et al. | 180/287 |
| 2008/0289895 A1 * | 11/2008 | Goi | 180/272 |
| 2009/0092296 A1 * | 4/2009 | Yokoyama et al. | 382/124 |
| 2009/0187309 A1 * | 7/2009 | Miki | 701/36 |

FOREIGN PATENT DOCUMENTS

| | | |
|---|---|---|
| JP | A-09-294729 | 11/1997 |
| JP | A-2003-146107 | 5/2003 |
| JP | A-2003-290164 | 10/2003 |
| JP | 2003-339651 A | 12/2003 |
| JP | A-2003-339651 | 12/2003 |
| JP | 2004-344375 A | 12/2004 |
| JP | A-2007-186124 | 7/2007 |
| JP | 2008-86724 A | 4/2008 |
| JP | A-2008-127000 | 6/2008 |

\* cited by examiner

ENGINE STARTING CONTROLLER

CROSS REFERENCE TO RELATED APPLICATION

This application is based on and incorporates herein by reference Japanese Patent Application No. 2008-204187 filed on Aug. 7, 2008.

BACKGROUND OF THE INVENTION

1. Field of the Invention

The present invention relates to an engine starting controller.

2. Description of Related Art

In order to prevent drunken driving, a technology, which detects a drunken state of a driver and prohibits starting of an engine of a vehicle if the detected drunken state is equal to or higher than a predetermined criterion, is known (see JP7-009924A and JP2007-186124A, for example). Moreover, in order to prevent thefts of vehicles, another technology is known. The technology takes an image of a driver's face etc. with a camera, determines whether the driver is an authorized person or not by comparing the taken image with a registered image that has been registered in advance, and prohibits the driver from starting an engine of a vehicle if it is determined that the driver is not the authorized person.

It is possible to combine the engine starting prohibition/permission system based on the drunken state of a driver and the engine starting prohibition/permission system based on an individual certification of a driver.

However, in the combined system, a sensor for detecting the drunken state of a driver and the camera for taking the image of the driver's face are installed at different positions. Therefore, a configuration of the system becomes complicated.

SUMMARY OF THE INVENTION

The present invention is made in view of the above-mentioned problem. Thus, it is an objective of the present invention to simplify a configuration of a system that controls prohibition and permission of starting of an engine based on a detection of a drunken state of a driver and an individual certification of the driver.

To achieve the objective of the present invention, there is provided an engine starting controller mounted on a vehicle. The engine starting controller has a sensor, a case, an individual certification means, an alcohol concentration determiner and a permission means. The sensor detects a pulse of a driver of the vehicle at a detection part of a body of the driver with an optical method, and takes an image of the detection part. The sensor is installed in the case. The individual certification means determines whether the driver of the vehicle is an authorized person or not based on the image of the detection part taken by the sensor. The alcohol concentration determiner calculates an index value of a blood alcohol concentration of the driver based on the pulse detected at the detection part by the sensor, and determines whether the index value exceeds a criterial value of a drinking assessment or not. The permission means permits the driver to start an engine of the vehicle when it is determined by the individual certification means that the driver of the vehicle is the authorized person and it is determined by the alcohol concentration determiner that the index value does not exceed the criterial value of the drinking assessment. The sensor is configured to detect the pulse of the driver at the detection part and to take the image of the detection part when the driver brings the detection part close to the case.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF EXEMPLARY EMBODIMENTS

First Embodiment

Figure 1:
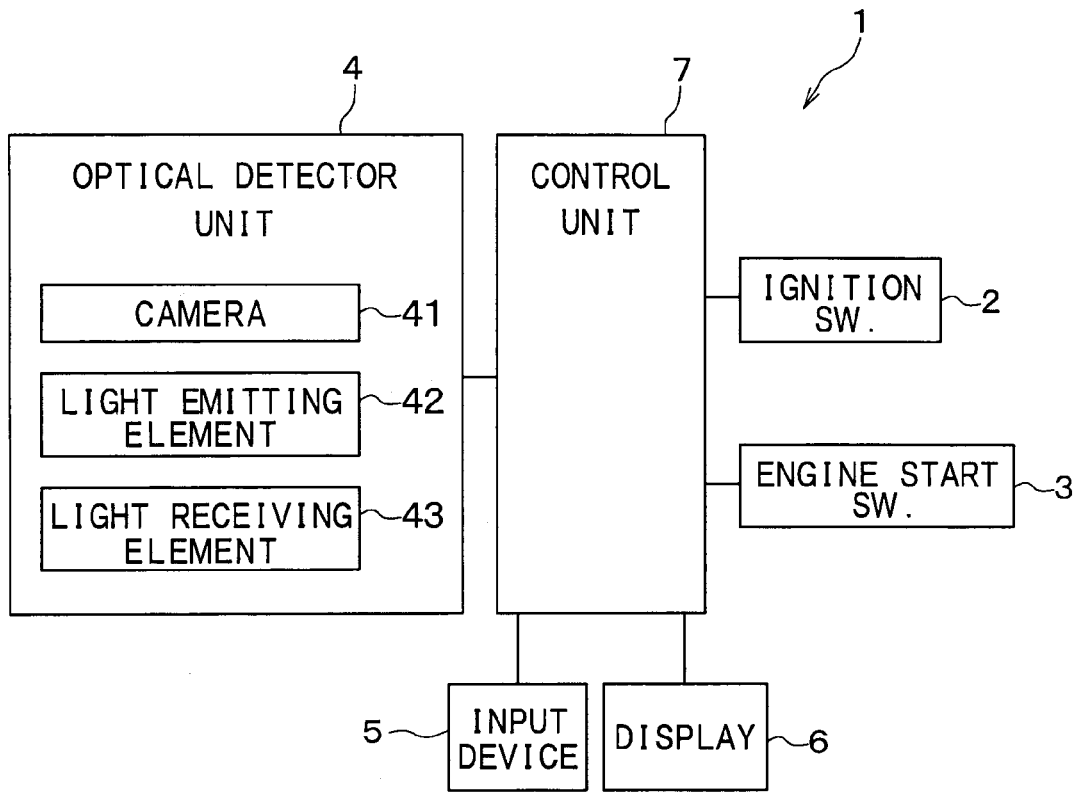
FIG. 1 is a block diagram showing a configuration of an engine starting controller according to a first embodiment of the present invention.

A first embodiment of the present invention will be described hereafter. FIG. 1 shows a configuration of an engine starting controller 1 according to the first embodiment. The engine starting controller 1 is mounted on a vehicle, and includes an ignition switch 2, an engine start switch 3, an optical detector unit 4, an input device 5, a display device 6, and a control unit 7.

The ignition switch 2 switches on an ignition of the vehicle in accordance with control signals sent from the control unit 7. When the ignition is switched on, electric power supply to apparatuses installed in the vehicle, which include a passenger compartment air conditioner, a vehicle navigation apparatus, an audio player and a radio receiving set, is started. The engine start switch 3 starts an engine of the vehicle in accordance with control signals sent from the control unit 7.

The optical detector unit 4 is an element that detects pulse wave of a driver at a body part (hereafter referred to as a detection part) of the driver by using an optical method, and takes photographs of the detection part.

The input device 5 receives user's operations, and outputs signals, which correspond to the received user's operations, to the control unit 7. The display device 6 displays visual information (characters, images, etc.) and outputs sounds to the user in accordance with control signals sent from the control unit 7. The display device 6 may include, for example, a liquid crystal display of the navigation apparatus, a display device on an instrument panel, a loudspeaker, etc.

The control unit 7 includes a CPU, RAMs, ROMs, flash memories (rewritable non-volatile memory devices), etc. The CPU reads out various programs memorized in the ROMs, spreads the programs on the RAMs, and executes the programs. In executing the programs, the CPU receives signals from the optical detector unit 4 and the input device 5 as needed, and controls the ignition switch 2, the engine start switch 3 and the display device 6 as needed. In the following descriptions, processes performed by the CPU are regarded as processes performed by the control unit 7. The processes performed by the control unit 7 will be described later in detail.

Figure 2:
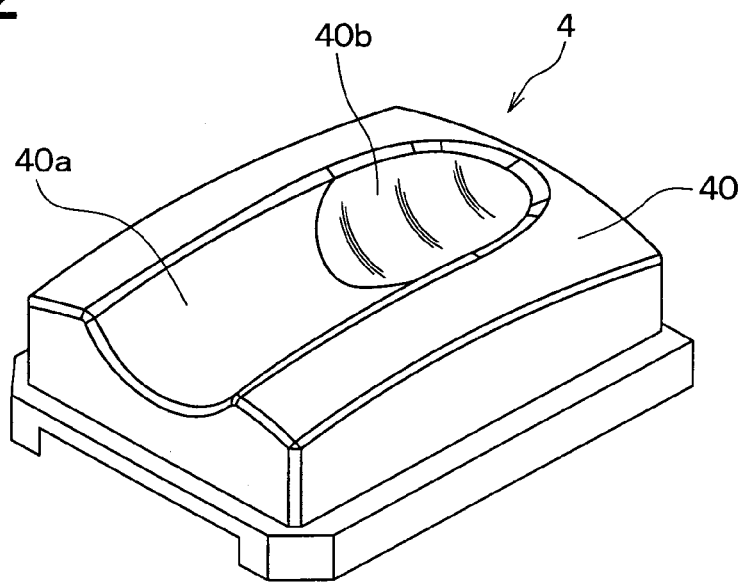
FIG. 2 is a perspective view showing an optical detector unit.
Figure 3:
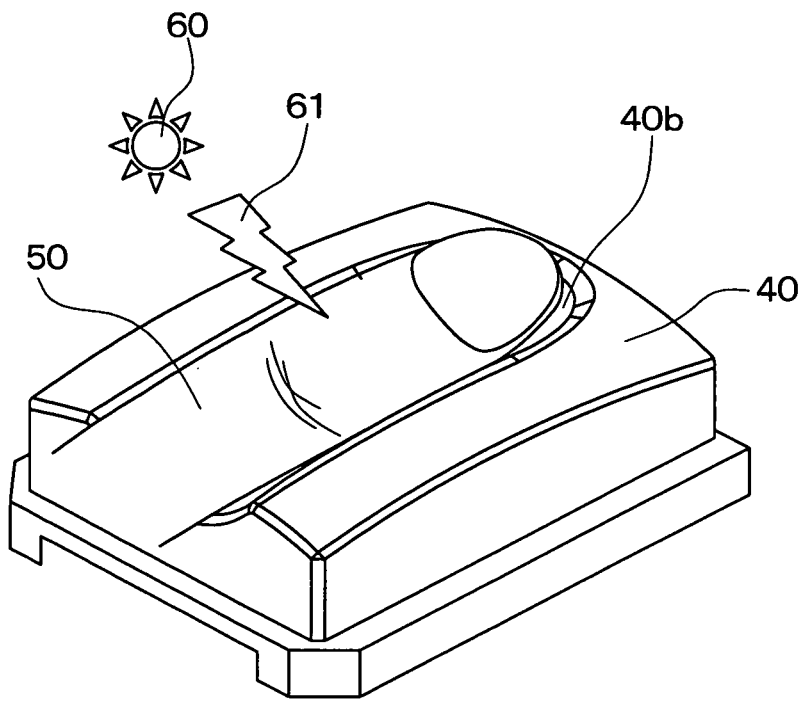
FIG. 3 is a diagram showing the optical detector unit on which a finger of a driver is placed.
Figure 4:
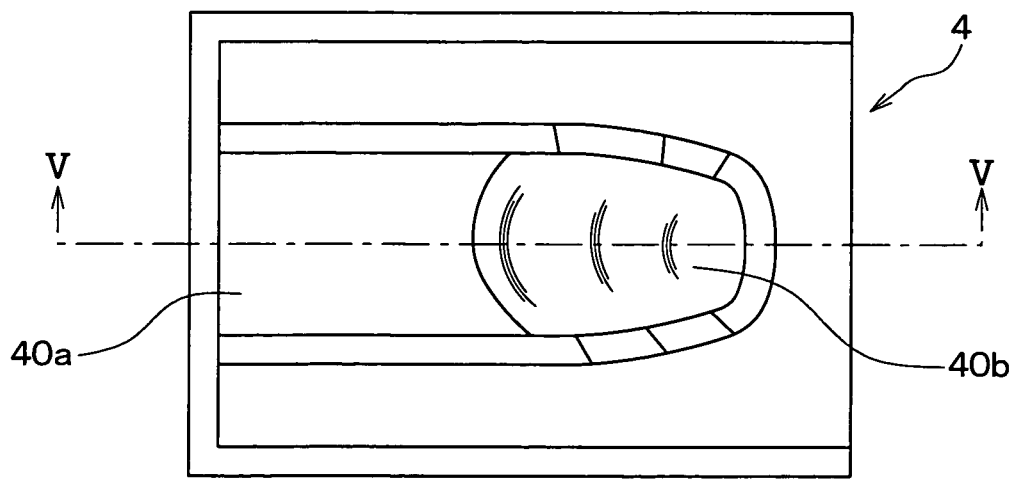
FIG. 4 is a plan view showing the optical detector unit.
Figure 5:
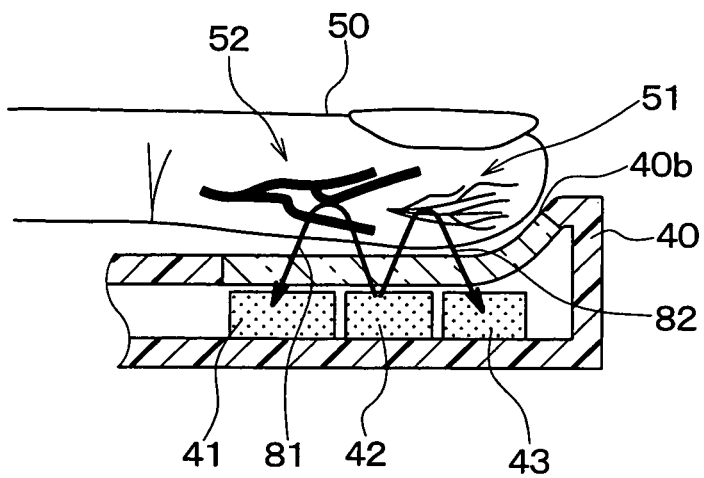
FIG. 5 is a cross-sectional view showing the optical detector unit, which is taken along a line V-V in FIG. 4.
Figure 6:
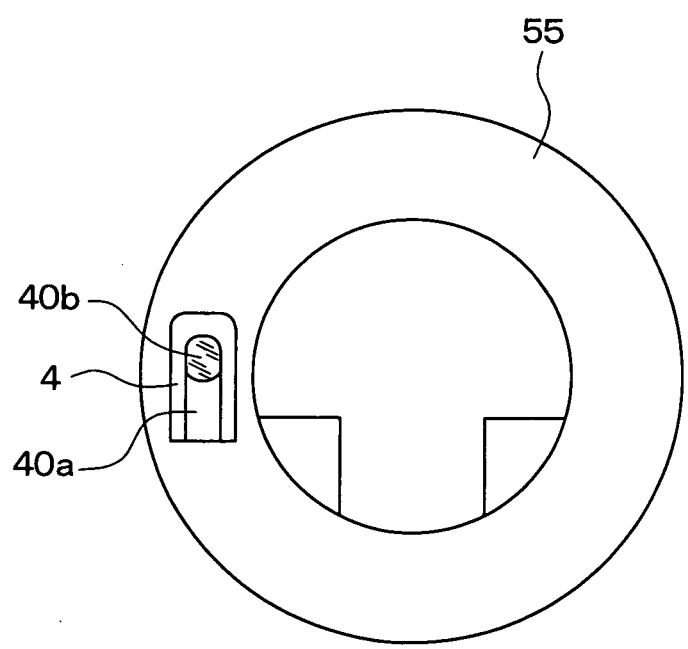
FIG. 6 is a diagram showing an installation position of the optical detector unit.

Next, the optical detector unit 4 will be described in detail referring to FIGS. 1-6. FIG. 2 is a perspective view showing an appearance of the optical detector unit 4. FIG. 3 is a diagram showing a state in which a finger 50 of a driver is placed on the optical detector unit 4. FIG. 4 is a plan view showing the optical detector unit 4 seen from its top side (from a side on which the finger 50 is placed). FIG. 5 is a cross-sectional view of the optical detector unit 4 on which the finger 50 is placed, which is taken along a line V-V in FIG. 4. FIG. 6 is a diagram showing an installation position of the optical detector unit 4.

The optical detector unit 4 includes a case 40, a camera 41, a light emitting elements group 42 and a light receiving element 43. As shown in FIGS. 2, 5, a top surface of the case 40 has a depressed portion 40a, 40b on which the finger 50 of a driver is placed. As shown in FIG. 3, when the finger 50 is placed on the depressed portion 40a, 40b, the finger 50 is supported by a shape of the depressed portion 40a, 40b so as to inhibit a side-to-side movement of the finger 50.

The depressed portion 40a, 40b includes a proximal side depressed portion 40a and a detection window 40b. The proximal side depressed portion 40a is opposed to a proximal side of the finger 50 placed thereon. The detection window 40b is opposed to a cushion of a fingertip (an example of the detection part) of the finger 50. The detection window 40b is a translucent member made of glass, resin, etc. The remainder portion of the case 40, which includes the proximal side depressed portion 40a, is made of opaque resin (or semitranslucent resin having a light transmittance lower than that of the detection window 40b), etc.

The light emitting elements group 42 includes two or more light emitting elements such as LEDs. In accordance with control signals sent from the control unit 7, the light emitting elements irradiate the fingertip of the finger 50 with a monochromatic light having a first wavelength (870 nm, for example) or a monochromatic light having a second wavelength (1300 nm, for example).

The camera 41 is an image sensors group such as a CCD camera for taking images in a fingertip area of the finger 50 placed on the detection window 40b. The camera 41 outputs the taken images of the fingertip to the control unit 7. Specifically, when the light emitting elements group 42 irradiates the fingertip with a light, the camera 41 takes an image with the light that has passed through an inside of the fingertip and enters into the camera 41. Therefore, a pattern of veins 52 of the finger 50 comes out on the image, which is taken by the camera 41 when the light emitting elements group 42 irradiates the fingertip with the light.

The light receiving element 43 is served by a photodiode etc. When a light, which is emitted from the light emitting elements group 42 to the fingertip of the finger 50, has passed through the inside of the fingertip and has come out into the light receiving element 43, the light receiving element 43 detects an amount of the light. As the detected amount of the light becomes larger, the light receiving element 43 impresses a larger output voltage (output signal) onto the control unit 7.

When the fingertip (detection part) is irradiated with a light by the light emitting elements group 42, the light incident upon small arteries 51 in the detection part is absorbed by blood constituents (for example, hemoglobin, blood alcohol, other blood constituents of which concentrations change as blood alcohol concentration changes, etc.) that flows through the small arteries 51. The remainder of the light is reflected and scattered in in-vivo tissue, and is partially received by the light receiving element 43. Quantities of the blood constituents in the small arteries 51 change in accordance with pulsations of the small arteries 51. Therefore, an amount of the light absorbed by the blood constituents also changes in accordance with the pulsations. As a result, a value (voltage) of the output signal of the light receiving element 43 changes in accordance with the pulsations of the small arteries. In this manner, the light receiving element 43 detects the pulse wave in the fingertip with an optical method, and outputs signals, which change in accordance with the detections, to the control unit 7.

As shown in FIG. 5, the camera 41, the light emitting elements group 42 and the light receiving element 43 are installed in an inside of the case 40. Specifically, the camera 41, the light emitting elements group 42 and the light receiving element 43 are arranged directly below the detection window 40b. Therefore, in a state where the finger 50 is placed on the depressed portion 40a, 40b, the cushion of the fingertip of the finger 50 is opposed to the members 4143 so as to interpose the detection window 40b therebetween.

More specifically, the camera 41 is located closer to the proximal side depressed portion 40a (to a proximal side of the finger 50) than the light emitting elements group 42 and the light receiving element 43. The light emitting elements group 42 is located farther from the proximal side depressed portion 40a than the camera 41 (closer to a distal end of the finger 50 than the camera 41). The light emitting elements group 42 is located closer to the proximal side depressed portion 40a than the light receiving element 43. The light receiving element 43 is located farther from the proximal side depressed portion 40a than the light emitting elements group 42.

Therefore, as indicated by arrows 81 in FIG. 5, the camera 41 takes the images with a light that has passed through a proximal side portion in the fingertip, and the light receiving element 43 receives a light that has passed through a distal side portion in the fingertip.

A target of detection by the light receiving element 43 is the pulse wave in the small arteries 51. The small arteries 51 lie more than the veins 52 in the distal side portion in the fingertip of the finger 50. The veins 52 lie more than the small arteries 51 in the proximal side portion in the fingertip of the finger 50. Therefore, as mentioned above, the light receiving element 43 for detecting the pulse wave is located closer to the distal side portion in the fingertip of the finger 50, which is placed in the depressed portion 40a, 40b, than the camera 41 for taking the images of the veins 52. Therefore, the light receiving element can securely detect the pulse wave, and the camera 41 can take images of the veins 52 with accuracy.

Moreover, the depressed portion 40a, 40b is shaped as a general shape of a cushion of a human's finger. Therefore, as shown in FIG. 3, when the finger 50 is placed in the depressed portion 40a, 40b, the cushion of the fingertip covers the detection window 40b. Accordingly, a light 61 from an external system such as sun 60 (namely, a light generated outside the optical detector unit 4) hardly passes through the detection window 40b to reach the camera 41 and the light emitting elements group 42.

It is desirable to install the optical detector unit 4 at a position on which the driver sitting on a driver's seat can naturally place his/her finger in the passenger compartment. By installing the optical detector unit 4 at such a position, it is possible to perform the engine starting control based on an individual certification and a detection of blood alcohol concentration, which will be described later, just by performing a simple operation of bringing the finger 50 close to the optical detector unit 4 and placing the finger 50 on the depressed portion 40a, 40b after the driver has seated on the driver's seat.

For example, as shown in FIG. 6, the optical detector unit 4 may be installed on a driver side surface of a grip of a steering wheel 55. In this case, if the driver only grips the steering wheel 55, a thumb of the driver is placed in the depressed portion 40a, 40b of the optical detector unit 4. Therefore, if the driver only performs operations necessary for driving the vehicle, it is also possible to perform operations necessary for the individual certification and the detection of blood alcohol concentration at the same time.

Next, an operation of the control unit 7 will be described hereafter. The control unit 7 executes a program 100 shown in a flowchart of FIG. 7 so as to perform the engine starting control based on the individual certification and the detection of the blood alcohol concentration.

The control unit 7 starts executing the program 100 when the driver operates the input device 5 to command a start of the engine starting control, for example. In this case, the driver brings his/her finger 50 close to the optical detector unit 4, and puts the finger 50 on the case 40 so as to place the finger 50 in the depressed portion 40a, 40b. Then, the driver operates the input device 5 by using another finger (for example, a finger of another hand than a hand having the finger 50) in order to command the start of the engine starting control.

Alternatively, the engine starting controller 1 may have a proximity sensor (not shown) for detecting proximity of a finger to the depressed portion 40a, 40b of the case 40. In this case, the control unit 7 starts executing the program 100 in response to a signal sent from the proximity sensor when the finger comes in proximity to the depressed portion 40a, 40b of the case 40.

Figure 8:
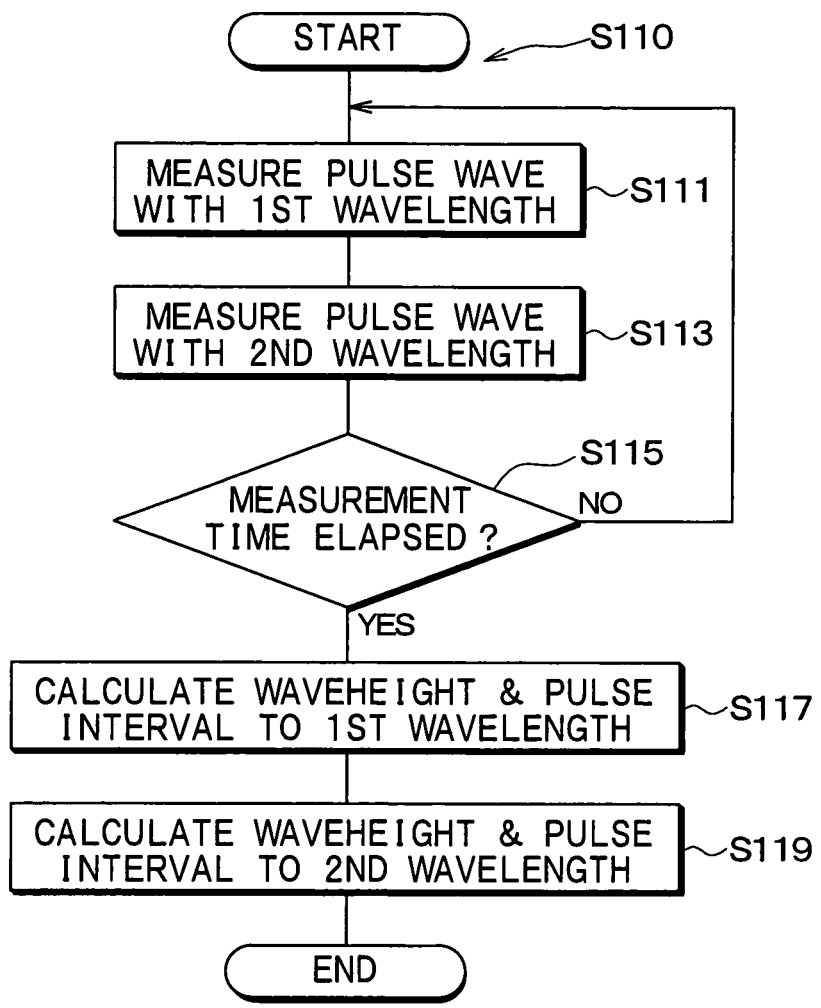
FIG. 8 is a flowchart showing a pulse wave measuring process at step S110 in the flowchart of FIG. 7.

In executing the program 100, firstly at step S110, the control unit 7 performs measurements of the pulse wave with the light emitting elements group 42 and the light receiving element 43. Specifically, as shown in FIG. 8, the control unit 7 repeats the measurements of the pulse wave with a light having a first wavelength (see step S111) and the measurements of the pulse wave with a light having a second wavelength (see step S113) by turns for a predetermined measurement time (for example, 10 seconds, 40 seconds, etc) (see step S115). A time necessary for performing one measurement of the pulse wave with the light having the first wavelength or the light having the second wavelength is sufficiently shorter than the predetermined measurement time (for example, one-tenth the predetermined measurement time or less), and is sufficiently shorter than an ordinary human's pulse period (for example, one-tenth the period of the normal human pulse wave or less). For example, the time necessary for performing one measurement of the pulse wave is 50 milliseconds. Accordingly, it is possible to perform both of a detection of the pulse wave with the light having the first wavelength and a detection of the pulse wave with the light having the second wavelength approximate at the same pulse timing.

In performing the detection of the pulse wave with the light having the first wavelength, the control unit 7 controls the light emitting elements group 42 to emit the light having the first wavelength. Accordingly, the light having the first wavelength goes through the detection window 40b into the inside of the distal side portion of the fingertip of the finger 50. A part of the light, which has not been absorbed in the small arteries 51, reaches the light receiving element 43. At this time, the control unit 7 records in the RAMs together with current time information a signal (specifically a voltage value) outputted from the light receiving element 43 as a pulse wave signal at that timing in response to the light having the first wavelength.

In an analogous fashion, in performing the detection of the pulse wave with the light having the second wavelength, the control unit 7 controls the light emitting elements group 42 to emit the light having the second wavelength. Accordingly, the light having the second wavelength goes through the detection window 40b into the inside of the distal side portion of the fingertip of the finger 50. A part of the light, which has not been absorbed in the small arteries 51, reaches the light receiving element 43. At this time, the control unit 7 records in the RAMs together with current time information a signal (specifically a voltage value) outputted from the light receiving element 43 as a pulse wave signal at that timing in response to the light having the second wavelength.

When the predetermined measurement time is elapsed (YES at step S115), the control unit 7 calculates a waveheight and a pulse interval of each wave, which corresponds to one pulse, in the pulse wave signal that is sequentially recorded in response to the light having the first wavelength. Then, the control unit 7 sequentially records the calculated pulse intervals (see step S117).

Then, the control unit 7 calculates a waveheight and a pulse interval of each wave in the pulse wave signal that is sequentially recorded in response to the light having the second wavelength. Then, the control unit 7 sequentially records the calculated pulse intervals (see step S119). Accordingly, a process at step S110 in the flowchart of FIG. 7 completes. Then, the control unit 7 perform step S120.

Figure 9:
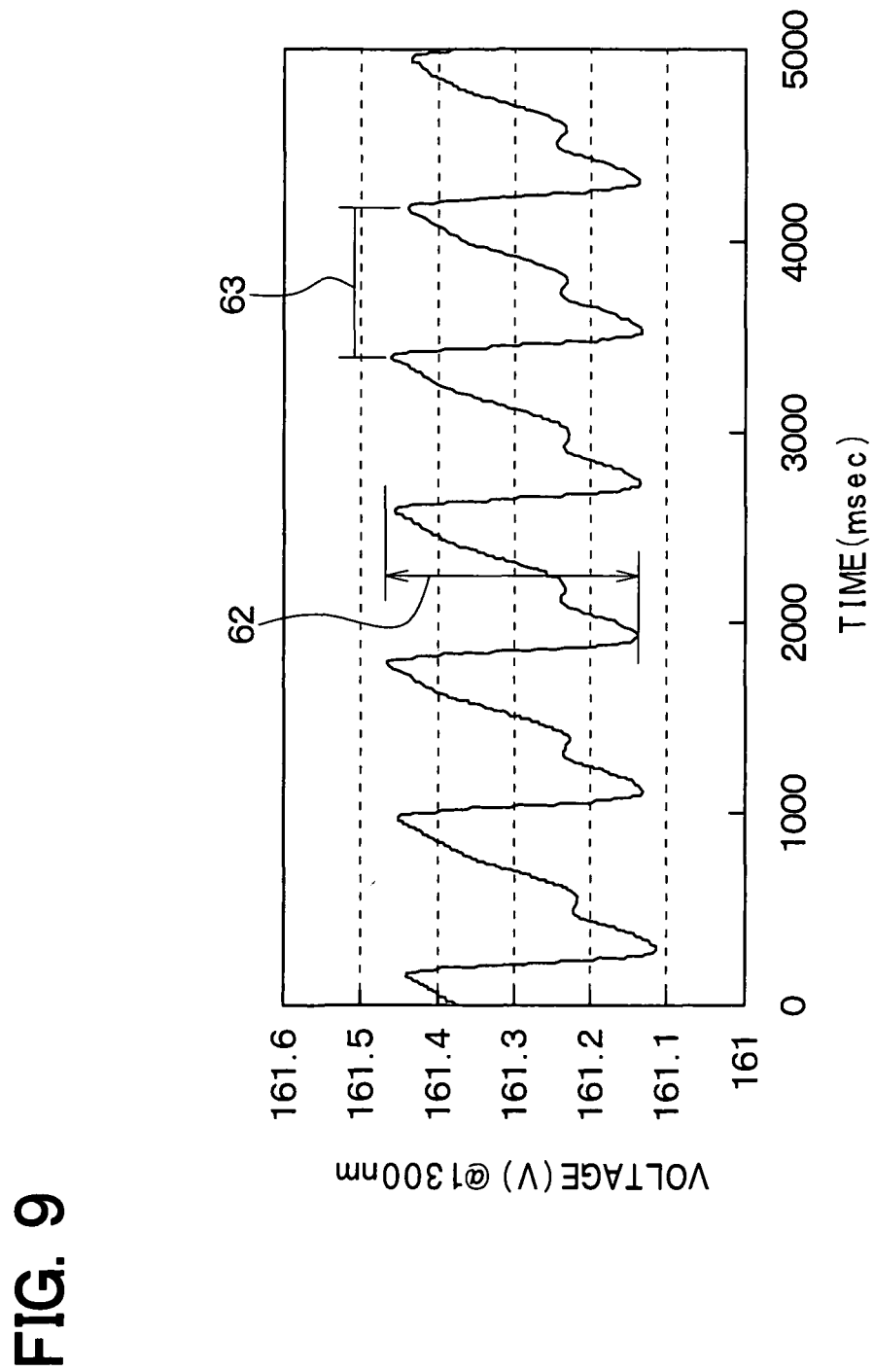
FIG. 9 is a graph showing a pulse wave signal outputted by a light receiving element in response to a light having a wavelength of 1300 nm.

As an example of the pulse wave signal that is sequentially recorded, FIG. 9 shows the pulse wave signal outputted from the light receiving element 43 in response to a light having a wavelength of 1300 nm. In FIG. 9, a horizontal axis indicates time (milliseconds), and a vertical axis indicates the value (specifically the voltage value) of the pulse wave signal. As shown in FIG. 9, the pulse wave signal of ordinary human has a shape in which a wave, which corresponds to one pulse, is periodically repeated. A difference 62 between a maximum value and a minimum value of the pulse wave signal in one wave is referred to as the waveheight, and a time interval 63 between peaks of two adjoining waves is referred to as the pulse interval.

A method for calculating the waveheight and the pulse interval of each wave from the pulse wave signal in the predetermined measurement period is common known. For example, the method is described in JP2003-290164A, JP2003-047601A that corresponds to US2002/0183627A1, and JP2003-339651A.

For example, local maximum values (peaks) and local minimum values (bottoms) of the pulse wave signal are detected first. Then, among the detected peaks and bottoms, a difference between a value of one bottom and a value of a peak, which is subsequent to the one bottom, is regarded as the waveheight of one wave. Then, a time interval from a peak to the next peak is regarded as one pulse interval. Local maximum values other than the largest local maximum value and local minimum values other than the smallest local minimum value in the one wave are excluded from the detection of the peak and the bottom.

Figure 7:
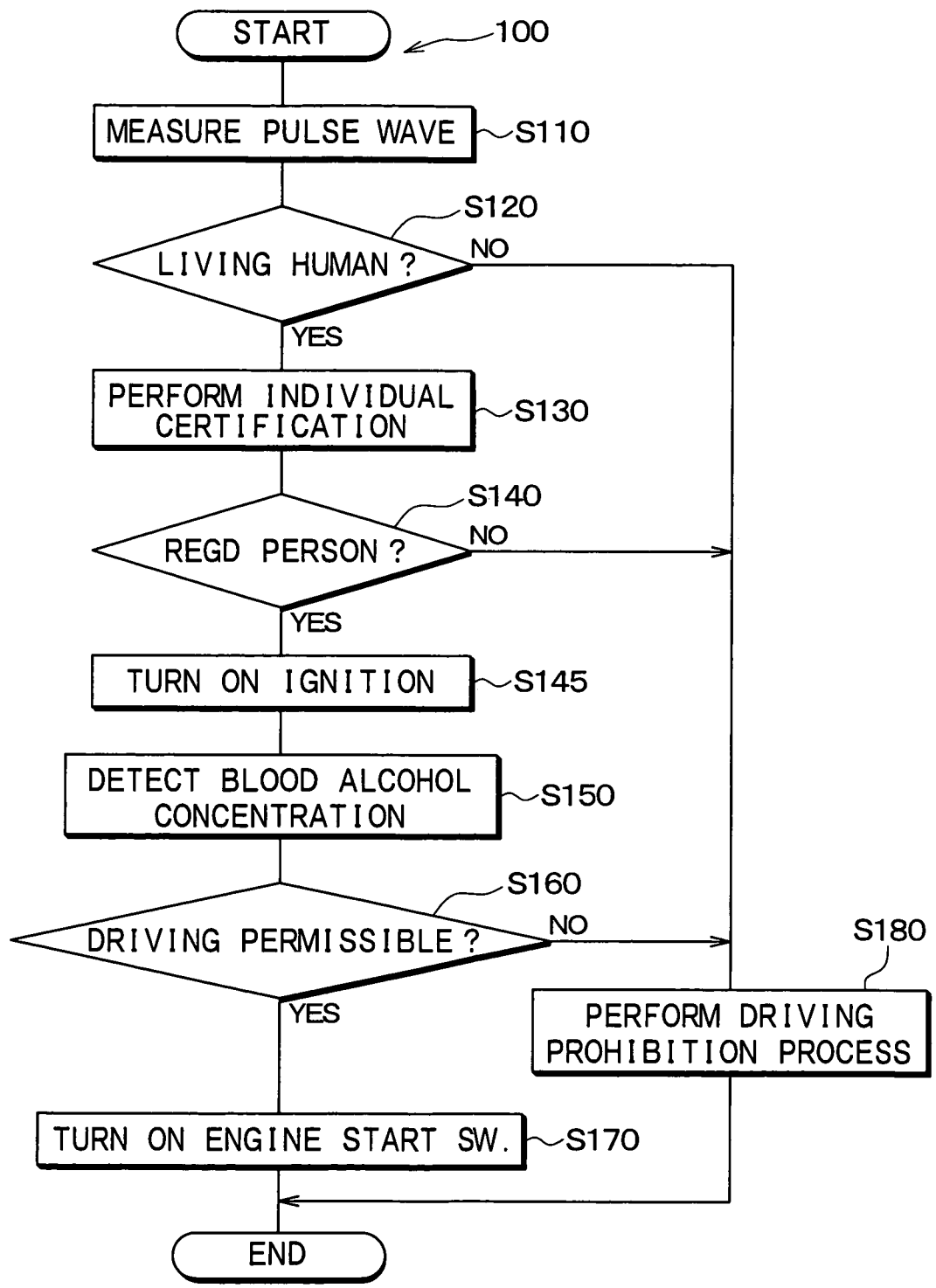
FIG. 7 is a flowchart of a program performed by a control unit.

At step S120 in the flowchart of FIG. 7, the control unit 7 determines whether the pulse wave signal is a living human's pulse wave signal or not, based on either or both of the measured waveheights and the measured pulse intervals of the pulse wave signal. This determination acts as a determination of whether the fingertip placed on the detection window 40b is a living human's fingertip or not.

For example, if an average value of the pulse intervals of either or both of the pulse wave signal in response to the light having the first wavelength and the pulse wave signal in response to the light having the second wavelength is within a predetermined pulse interval range, it is possible to determine that the fingertip is a living human's fingertip. Otherwise, it is possible to determine that the fingertip is not a living human's fingertip. As the predetermined pulse interval range, it is possible to adopt a range that is probable as human's pulse interval (for example, a range of 0.3 second to 2 seconds).

Alternatively, it is also possible to determine that the fingertip is a living human's fingertip if an average value of the pulse intervals of either or both of the pulse wave signal in response to the light having the first wavelength and the pulse wave signal in response to the light having the second wavelength is within the predetermined pulse interval range and if an average value of the waveheights of either or both of the pulse wave signal in response to the light having the first wavelength and the pulse wave signal in response to the light having the second wavelength is within a predetermined waveheight range. Otherwise, it is possible to determine that the fingertip is not a living human's fingertip. As the predetermined waveheight range, it is possible to adopt a range that is probable as the waveheight of human's pulse.

If it is determined at step S120 that the fingertip is a living human's fingertip, step S130 is performed next. If it is determined at step S120 that the fingertip is not a living human's fingertip, the process proceeds to step S180.

At step S130, a control process for the individual certification is performed. Specifically, the control unit 7 controls the light emitting elements group 42 to irradiate the finger 50 with a light having a wavelength of 900 nm or shorter (for example, 870 nm), which is suitable for taking images of veins. The light having the wavelength of 900 nm or shorter is either of the light having the first wavelength and the light having the second wavelength. At the same time, the control unit 7 controls the camera 41 to take an image of the proximal side portion of the fingertip of the finger 50. Accordingly, the camera 41 outputs the image taken with the light that has passed through the proximal side portion of the fingertip of the finger 50 where the veins 52 lie, to the control unit 7. The control unit 7 receives the taken image. Therefore, a vein pattern in the proximal side portion of the fingertip of the finger 50 comes out on the image received by the control unit 7.

Then, at step S140, the control unit 7 determines whether the finger 50, which is taken in the image, is a properly registered person's finger or not, based on the taken image of the vein pattern. Specifically, the taken image is compared with each of registered vein pattern image(s) in the proximal side portion of the fingertip of the properly registered person. The registered vein pattern image(s) may be one person's vein pattern image or may be images of two or more persons' vein pattern images, and are recorded in a flash memory of the control unit 7 in advance.

If there is a registered vein pattern image of which a degree of agreement with the taken image is greater than a predetermined value, it is determined that the finger is a properly registered person's finger. Otherwise, it is determined that the finger is not a properly registered person's finger. Each of the registered vein pattern images is associated with identification information (name, identification code, etc.) of an authorized driver who corresponds to the registered vein pattern image, and is recorded in the flash memory together with the identification information. When it is determined that the finger is a properly registered person's finger, the control unit 7 identifies the identification information that corresponds to the registered vein pattern image of which a degree of agreement with the taken image is greater than the predetermined value. Then, the control unit 7 determines that the current driver is an authorized driver who corresponds to that identification information.

The registered vein pattern images are recorded in the flash memory by the following methods, for example. First, an authorized driver of the vehicle places his/her finger 50 in the depressed portion 40a, 40b of the case 40. Then, the authorized driver operates the input device 5 to register his/her vein pattern image and to input his/her identification information. In response to the operation to register the vein pattern image, the control unit 7 controls the optical detector unit 4 and the camera 41 as step S130. By controlling the optical detector unit 4 and the camera 41, the control unit 7 receives the vein pattern image in the proximal side portion of the fingertip of the authorized driver, which is taken by and outputted from the camera 41. Then, the control unit 7 records the vein pattern image as a registered vein pattern image in the flash memory together with the identification information inputted by the authorized driver.

If it is determined at step S140 that the finger 50 is a properly registered person's finger, step S145 is performed next. If it is determined at step S140 that the finger 50 is not a properly registered person's finger, the process proceeds to step S180.

At step S145, the control unit 7 controls the ignition switch 2 so as to switch on an ignition of the vehicle.

Next, blood alcohol concentration of the driver is detected at step S150. Specifically, a waveheight ratio between the waveheight of the pulse wave signal in response to the light having the first wavelength and the waveheight of the pulse wave signal in response to the light having the second wavelength at the same pulse timing is calculated. Based on this calculation result, it is determined that the driver is in a drunken state or not.

Figure 10:
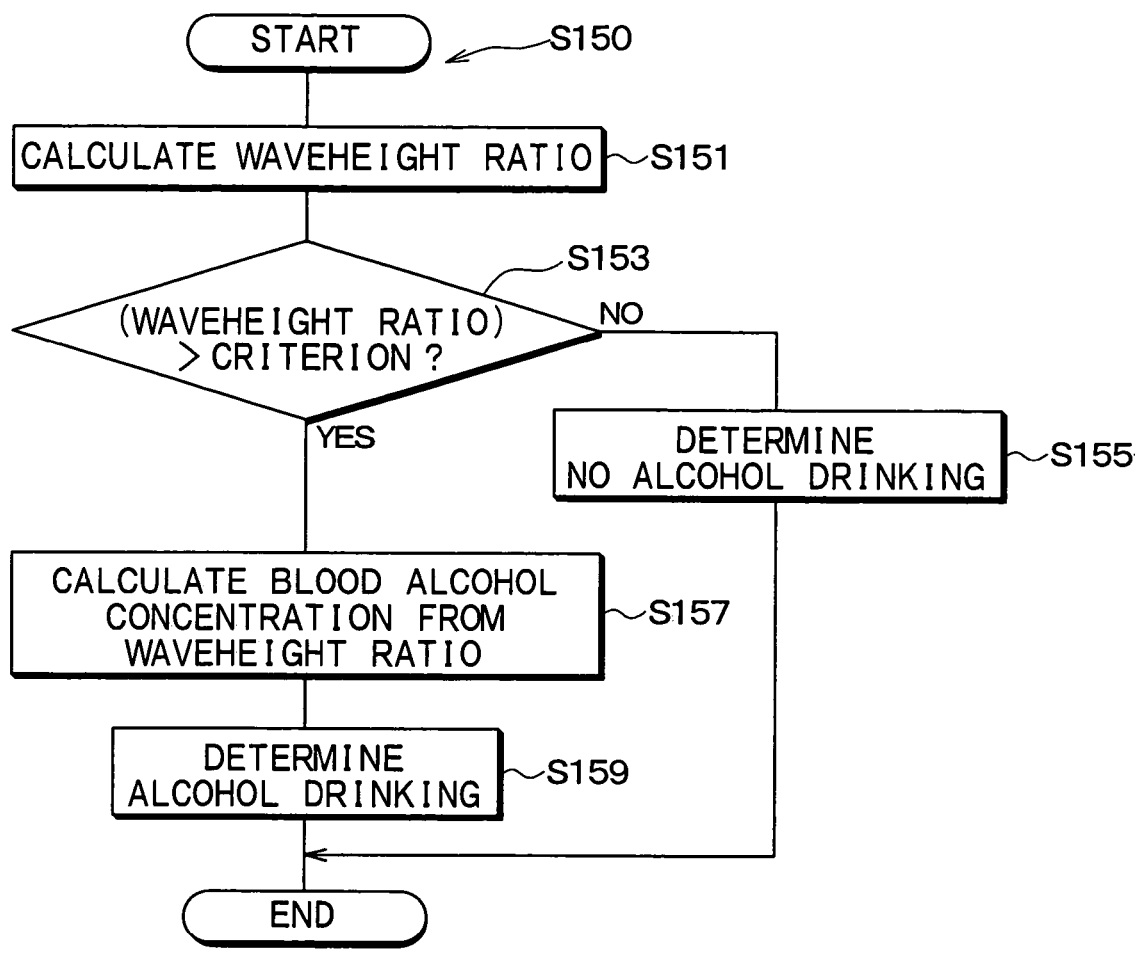
FIG. 10 is a flowchart showing a blood alcohol concentration detecting process at step S150 in the flowchart of FIG. 7.

FIG. 10 shows a blood alcohol concentration detecting process at step S150 in detail. In performing step S150, firstly at step S151, the control unit 7 calculates the waveheight ratio for every pair of the waveheights of the pulse wave signals in response to the lights having the first and second wavelengths, which are recorded at step S110.

The waveheight ratio of a pair of the waveheights of the pulse wave signals in response to the lights having the first and second wavelengths in the same pulse (at the same pulse timing) is H1/H2. Here, H1 is a waveheight of one wave in the pulse wave signal in response to the light having the first wavelength. H2 is a waveheight of a wave in the pulse wave signal in response to the light having the second wavelength, which is detected at the same pulse timing as the one wave in the pulse wave signal in response to the light having the first wavelength.

If a turn of a wave in a sequence of waves in the pulse wave signal in response to the light having the first wavelength recorded at step S110 is the same as a turn of a wave in a sequence of waves in the pulse wave signal in response to the light having the second wavelength recorded at step S110, it is determined that the two waves are detected at the same pulse timing.

Then, at step S153, it is determined whether a central value of the waveheight ratios calculated at step S151 is greater than a criterial waveheight ratio (an example of a criterial value of drinking assessment) or not. If the central value of the waveheight ratios is greater than the criterial waveheight ratio, step S157 is performed next. Otherwise, step S155 is performed next. As the central value of the waveheight ratios, a mean value of the waveheight ratios may be used. The criterial waveheight ratio will be described later. At step S155, it is determined that "the driver had no alcohol drinking", and the process at step S150 in the flowchart of FIG. 7 completes.

At step S157, the blood alcohol concentration is calculated based on the above-mentioned central value. Then, at step S159, it is determined that "the driver had alcohol drinking", and the process at step S150 in the flowchart of FIG. 7 completes.

In this manner, if the central value of the waveheight ratios of the waveheights of the pulse wave signals in response to the lights having the first and second wavelengths, which are detected at the same pulse timing, is greater than the criterial waveheight ratio, it is determined at step S150 that "the driver had alcohol drinking". If the central value of the waveheight ratios is not greater than the criterial waveheight ratio, it is determined at step S150 that "the driver had no alcohol drinking". If it is determined that "the driver had alcohol drinking", the blood alcohol concentration is calculated. The central value of the waveheight ratios of the waveheights of the pulse wave signals in response to the lights having the first and second wavelengths, which are detected at the same pulse timing, increases as the blood alcohol concentration increases, and decreases as the blood alcohol concentration decreases. Therefore, the central value of the waveheight ratios is used as an index value of the blood alcohol concentration. A validity of using the waveheight ratio as the index value of the blood alcohol concentration will be described later.

Subsequent to step S150, it is determined at step S160 whether a driving by the driver is permissible or not. Specifically, if it is determined at step S150 that "the driver had alcohol drinking", it is determined at step S160 that the driving by the driver is not permissible, and the process proceeds to step S180. If it is determined at step S150 that "the driver had no alcohol drinking", it is determined at step S160 that the driving by the driver is permissible, and the process proceed to step S170.

At step S170, the engine is started by controlling the engine start switch 3, and the execution of the program 100 completes.

At step S180, a process for prohibiting driving is performed, and the execution of the program 100 completes. At step S180, the display device 6 may notify that the driver is not permitted to drive the vehicle, for example. In this case, if the blood alcohol concentration of the driver has been calculated at step S150, the display device 6 may display at step S180 the value of the calculation result. Alternatively, only a process of completing the program 100 may be performed at step S180. Even in this case, it is possible to avoid the engine starting process at step S170 by performing step S180. Therefore, a process for prohibiting driving is substantially realized.

By executing the above-described program 100, the control unit 7 measures at step S110 the pulse wave signals with the light emitting elements group 42 in the fingertip of the driver placed on the detection window 40b of the optical detector unit 4. Then, it is determined at step S120 whether the finger is a living human's finger or not based on the pulse wave signals. If the finger is a living human's finger, the individual certification process is performed at step S130 with the camera 41. Next, it is determined at step S140 whether the driver is a properly registered person or not based on the result of the individual certification process.

If the driver is a properly registered person, the ignition of the vehicle is switched from OFF to ON at step S145. Next, at step S150, the pulse wave signals are measured with the light having the first wavelength and the light having the second wavelength, and the index value of the blood alcohol concentration is obtained based on the measured two pulse waves. Then, it is determined at step S160 whether driving by the driver is permissible or not based on the calculated index value of the blood alcohol concentration. It the driving by the driver is permissible, the engine is started at step S170.

If it is determined that the finger placed on the detection window 40b is not a living human's finger (NO at step S120), or if it is determined that the driver is not a properly registered person (NO at step S140), the engine is not started (see step S180). Therefore, it is possible to inhibit an outsider from stealing the vehicle.

Even if the driver is a properly registered person (YES at step S140), the engine is not started (see step S180) if the index value of the blood alcohol concentration of the driver is a value at which driving is not permissible (NO at step S160). Therefore, it is possible to prevent the driver from drunken driving. In this case, however, the driver is a properly registered person, and the ignition has been switched on at step S145. Therefore, even if a properly registered person is drunken, the properly registered person can activate and use in-vehicle apparatuses such as the passenger compartment air conditioner, the vehicle navigation apparatus, the audio player and the radio receiving set until the battery electric power of the vehicle runs out.

Moreover, the control unit 7 uses the pulse wave signals measured at step S110 to determine whether the finger placed on the detection window 40b is a living human's finger or not and to detect the blood alcohol concentration. In this manner, the same pulse wave signals (specifically the pulse wave signals at the same timing in the same frequency) are used for two functions of the determination of whether the finger is a living human's finger or not and the detection of the blood alcohol concentration. Therefore, the necessity of detecting the pulse wave signal for each of the two functions is obviated. Accordingly, it is possible to shorten a time in which the driver is kept waiting for the measurement of the pulse waves.

As described above, the engine starting controller 1 detects the pulse waves in the detection part of the body of the driver of vehicle with an optical method. Moreover, the engine starting controller has sensors 41, 43 for taking vein pattern images in the detection part, and a case 40 in which the sensors 41, 43 are installed.

Then, the engine starting controller 1 performs the individual certification by determining whether the driver of the vehicle is a properly registered person or not based on the vein pattern image in the detection part, which is taken by the camera 41. Moreover, the engine starting controller 1 calculates the index value of the blood alcohol concentration (specifically the waveheight ratio) of the driver based on the pulse wave signals in the detection part, which are outputted from the light receiving element 43. Then, the engine starting controller 1 detects the blood alcohol concentration by determining whether the calculated index value exceeds the criterial value (specifically the criterial waveheight ratio) of alcohol drinking.

Then, the engine starting controller 1 permits engine start of the vehicle when it is determined in the individual certification that the driver is a properly registered driver and it is determined in the detection of the blood alcohol concentration that the index value does not exceed the criterial value of alcohol drinking.

Furthermore, the driver brings his/her fingertip close to the detection window 40b of the optical detector unit 4 so as to place the fingertip thereon. Accordingly, the sensors 41, 43 can detect the pulse waves in the detection part, and can take vein pattern images in the detection part. That is, the sensors 41, 43 take vein pattern images and detect the pulse waves when the driver brings his/her fingertip close to the detection window 40b of the optical detector unit 4 so as to place the fingertip thereon.

In this manner, both of the function of detecting the pulse waves in the detection part of the driver for the determination of the blood alcohol concentration and the function of taking the vein pattern images in the detection part of the driver for the individual certification are integrated and are installed in one case 40. Therefore, it is possible to simplify the system configuration of the engine starting controller 1.

Furthermore, just by bringing the detection part of the body close to the case 40, the driver can perform both of the determination of the blood alcohol concentration and the individual certification. Accordingly, it is possible to improve usability for the driver.

Moreover, the case 40 has the depressed portion 40a, 40b having a shape for supporting the finger (detection part) of the driver. The sensors 41, 43 include the camera 41 and the light receiving element 43. The light receiving element 43 is located closer to the distal end of the finger, which is placed in the depressed portion 40a, 40b, than the camera 41.

Intended detection target of the light receiving element 43 is the pulse wave in the pulsing small arteries. In the finger 50, the small arteries 51 lie more than the veins 52 in the distal side portion of the finger 50, and the veins 52 lies more than the small arteries 51 in the proximal side portion of the finger 50. Therefore, as mentioned above, the light receiving element 43 for detecting the pulse waves is located closer to the distal end of the finger 50 than the camera 41 for taking images of the veins 52, so that the light receiving element 43 can detect the pulse waves more securely, and the camera 41 can take images of the veins 52 more accurately.

The engine starting controller 1 determines whether the detection portion is a living human's body part or not based on the pulse wave signals in the detection part, which are detected by the light receiving element 43. After the determination that the detection part is a living human's body part, the engine starting controller 1 determines whether the driver of the vehicle is a properly registered driver or not.

As a way to unfairly avoid the individual certification to start the engine, a finger cut off from a properly registered person (authorized person) can be brought close to the case 40 so as to pass oneself off as the properly registered person. In this regard, a detection part of a living human (specifically a detection part connected to a living human) has a pulsatory motion of arteries. Other detection parts not connected to a living human have no pulsatory motion. Therefore, as a measure against such a way to avoid the individual certification, it is determined whether the detection part is a living human's body part or not based on the pulse wave in the detection part brought close to the case 40. Accordingly, it is possible to raise accuracy of the individual certification.

The calculation of the index value of the blood alcohol concentration based on the pulse waves will be described hereafter. According to an inventors' experiment, when a light has a specific wavelength, a degree of light absorption in the small arteries changes in accordance with the blood alcohol concentration. It is considered that this is because alcohol in blood (or blood ingredient of which concentration changes in accordance with the blood alcohol concentration) principally absorbs a light having the specific wavelength.

Figure 11:
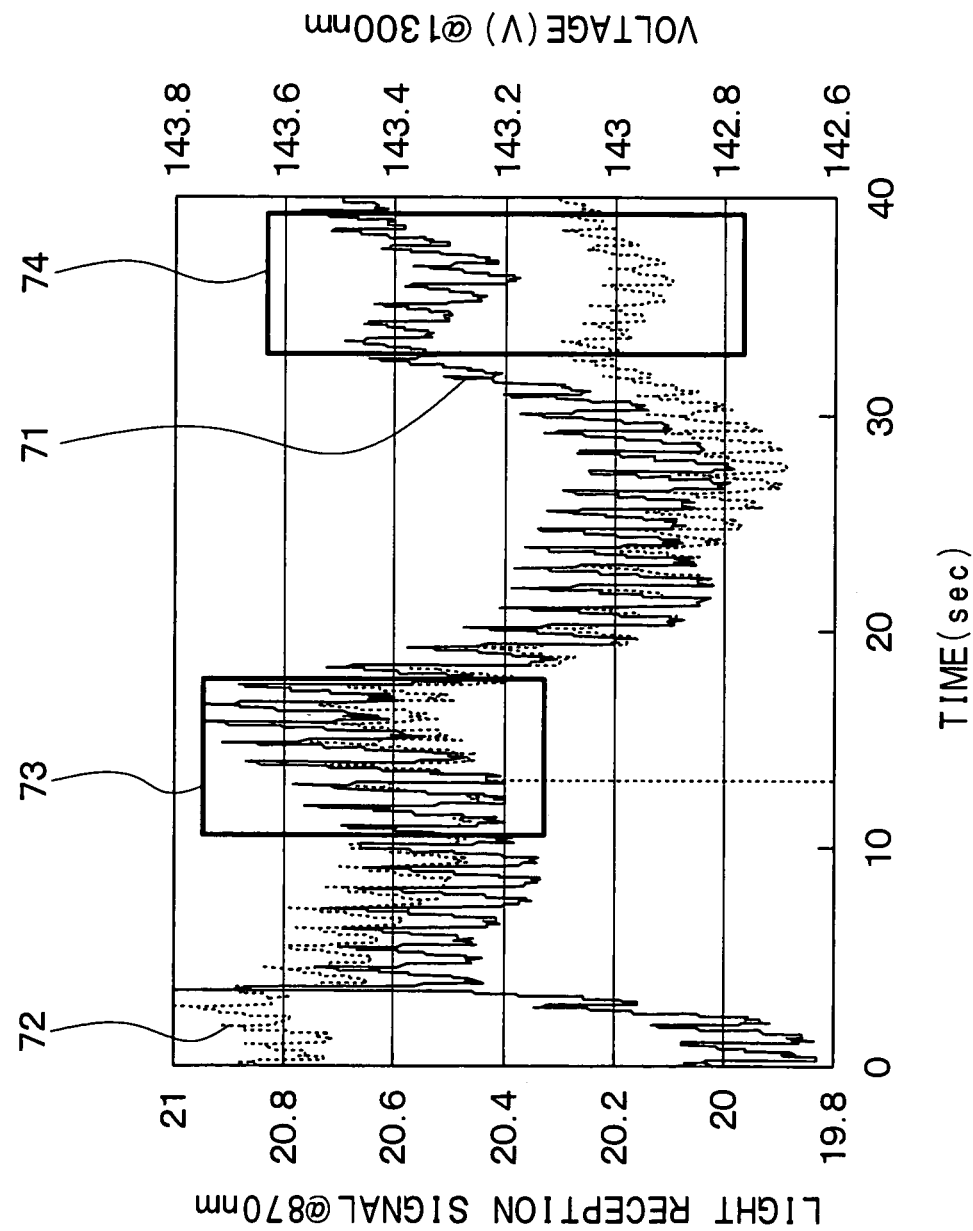
FIG. 11 is a graph showing an experimental result of a variation of an output value of the pulse wave signal.

Furthermore, according to the inventors' experiment, the output of the light receiving element 43, which reflects the pulsatory motion of the small arteries, is associated with the human's blood alcohol concentration. FIG. 11 is a graph showing the experimental result of a variation of output values of the pulse wave signals. In FIG. 11, the vertical axis indicates the value of the pulse wave signals outputted from the light receiving element 43. The horizontal axis indicates time (seconds).

In FIG. 11, a solid line 71 indicates the pulse wave signal in the detection part of a test subject person in response to a light having a wavelength of 870 nm. A dotted line 72 indicates the pulse wave signal in the detection part of the test subject person in response to a light having a wavelength of 1300 nm.

As shown in FIG. 11, the same person's pulse wave signals greatly changes depending on the wavelengths of the light used for the detection. Moreover, the waveheights of the pulse waves greatly changes depending on changes in physiology of the test subject person such as blood pressure and respiration. Here, the waveheight of the pulse wave refers to a variation of the pulse wave signals in each wave from a local minimum value to a local maximum value. For example, in a section 73 in FIG. 11, the waveheights of both pulse wave signals in response to the light having the wavelength of 870 nm and the light having the wavelength of 1300 nm are relatively large. In a section 74, the waveheights of both pulse wave signals are relatively small.

Figure 12:
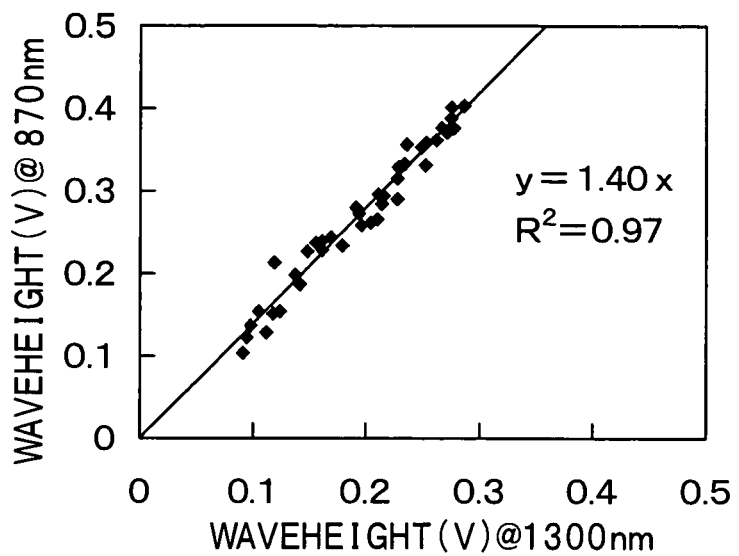
FIG. 12 is a graph showing calculation results of a waveheight ratio between a waveheight of a pulse wave signal in response to a light having a first wavelength and a waveheight of a pulse wave signal in response to a light having a second wavelength under the same blood alcohol concentration.

However, according to the inventors' experiment, the waveheight ratio between the waveheight of the pulse wave signal in response to the light having the first wavelength and the waveheight of the pulse wave signal in response to the light having the second wavelength at the same pulse timing of the same test subject person are approximately fixed, irrespective of the test subject person's blood pressure, respiration, etc. FIG. 12 shows calculation results of the waveheight ratio between the waveheight of the pulse wave signal of a test subject person in response to the light having the first wavelength and the waveheight of the pulse wave signal of the test subject person in response to the light having the second wavelength under the same blood alcohol concentration. In this experiment, the first and second wavelengths of the lights are 870 nm and 1300 nm.

In FIG. 12, the horizontal axis indicates the waveheight of the pulse wave in response to the light having the wavelength of 1300 nm. The vertical axis indicates the waveheight of the pulse wave in response to the light having the wavelength of 870 nm. Each dot in FIG. 12 corresponds one experimental result. As shown in FIG. 12, in a case where the blood alcohol concentration is constant, a square of a correlation coefficient R between the waveheight of the pulse wave in response to the light having the first wavelength and the waveheight of the pulse wave in response to the light having the second wavelength is 0.97. That is, the waveheight of the pulse wave in response to the light having the first wavelength and the waveheight of the pulse wave in response to the light having the second wavelength are in quite strong correlation. The waveheight ratio between the waveheight in response to the light having the wavelength of 870 nm and the waveheight in response to the light having the wavelength of 1300 nm are stable approximately at 1.40, which is indicated by a solid line in FIG. 12.

In this manner, the waveheight ratio between the two pulse wave signals in response to the lights having the first and second wavelengths absorbs intrapersonal differences caused by changes in blood pressure, respiration, etc. of the test subject person.

Furthermore, according to the inventors' experiment, the waveheights of the pulse wave signal in response to a light having a certain wavelength sensitively change in accordance with the blood alcohol concentration of the test subject person. In contrast, the waveheights of the pulse wave signal in response to a light having another certain wavelength are little influenced by the blood alcohol concentration of the test subject person. That is, there are a wavelength having high sensitivity to the blood alcohol concentration and a wavelength having low sensitivity to the blood alcohol concentration.

Figure 13:
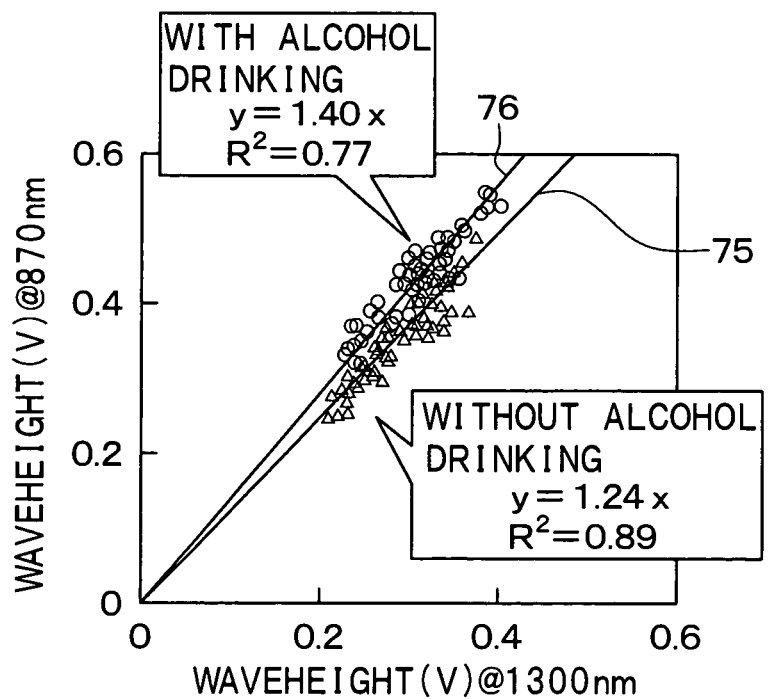
FIG. 13 is a graph showing measurement results of the waveheight ratio of the pulse wave signals under different blood alcohol concentrations.

Therefore, the waveheight ratio between the two pulse wave signals in response to the lights having the first and second wavelengths can be changed in accordance with the blood alcohol concentration of the test subject person. FIG. 13 shows experimental results of the waveheight ratio between the waveheight in response to the light having the wavelength of 870 nm and the waveheight in response to the light having the wavelength of 1300 nm.

In FIG. 13, the horizontal axis indicates the waveheight of the pulse wave in response to the light having the wavelength of 1300 nm. The vertical axis indicates the waveheight of the pulse wave in response to the light having the wavelength of 870 nm. In FIG. 13, each triangle corresponds to one experimental result of the waveheight ratio of the pulse wave of a test subject person having no alcohol drinking. Each circle corresponds to one experimental result of the waveheight ratio of the pulse wave of the same test subject person having alcohol drinking, whose blood alcohol concentration is 0.036%.

As shown in FIG. 13, in a case where the blood alcohol concentration of the test subject person is 0.036%, a square of the correlation coefficient R between the waveheight of the pulse wave in response to the light having the wavelength of 870 nm and the waveheight of the pulse wave in response to the light having the wavelength of 1300 nm is 0.77. In a case where the test subject person had no alcohol drinking, a square of the correlation coefficient R between the waveheight of the pulse wave in response to the light having the wavelength of 870 nm and the waveheight of the pulse wave in response to the light having the wavelength of 1300 nm is 0.89. That is, the waveheight of the pulse wave in response to the light having the wavelength of 870 nm and the waveheight of the pulse wave in response to the light having the wavelength of 1300 nm are in strong correlation. Moreover, in a case where the test subject person had no alcohol drinking, the waveheight ratio between the waveheight in response to the light having the wavelength of 870 nm and the waveheight in response to the light having the wavelength of 1300 nm are stable approximately at 1.24, which is indicated by a solid line 75. In a case where the blood alcohol concentration of the test subject person is 0.036%, the waveheight ratio between the waveheight in response to the light having the wavelength of 870 nm and the waveheight in response to the light having the wavelength of 1300 nm are stable approximately at 1.40, which is indicated by a solid line 76.

Figure 14:
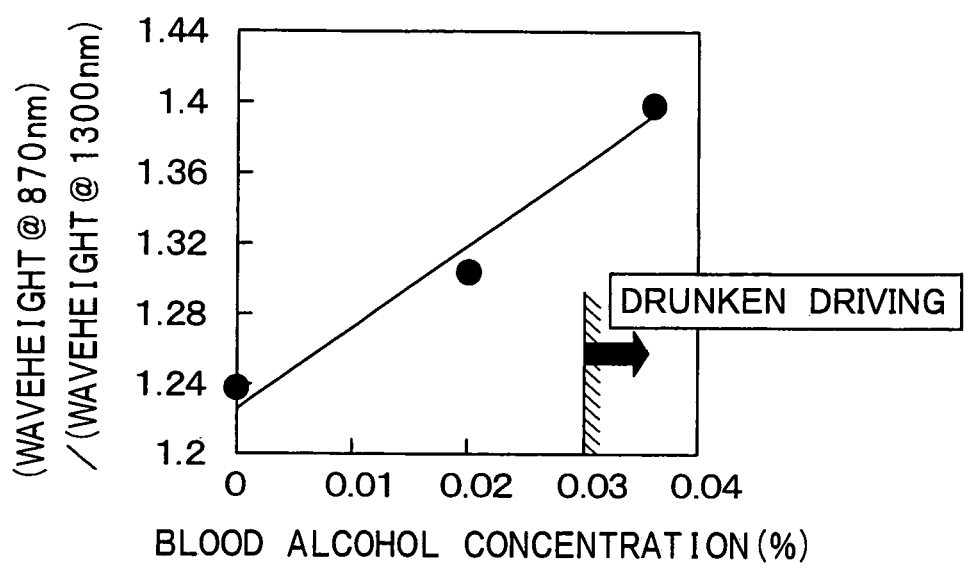
FIG. 14 is a graph showing experimental results of a relation between the waveheight ratio of the pulse wave signals and the blood alcohol concentration.

Therefore, there is a tendency that the waveheight ratio between the waveheight in response to the light having the wavelength of 870 nm and the waveheight in response to the light having the wavelength of 1300 nm increases as the blood alcohol concentration of the test subject person increases. FIG. 14 shows experimental results of a relation between the waveheight ratio of the pulse wave signals and the blood alcohol concentration. In FIG. 14, a horizontal axis indicates the blood alcohol concentration, and a vertical axis indicates the waveheight ratio between the waveheight of the pulse wave in response to the light having the wavelength of 870 nm and the waveheight of the pulse wave in response to the light having the wavelength of 1300 nm. Three dots in FIG. 14 correspond to experimental results of the relation between the waveheight ratio of the pulse wave signals and the blood alcohol concentration of the same test subject person. In the experiment of which the results are shown in FIGS. 11-14, fingertip of the test subject person is used as the detection part.

As described above, it is possible to calculate the index value of the blood alcohol concentration of the test subject person based on the waveheight ratio between the waveheight of the pulse wave in response to the light having the first wavelength and the waveheight of the pulse wave in response to the light having the second wavelength. Specifically, the waveheight ratio itself can be the index value of the blood alcohol concentration. In the above-described experiment example, the waveheight ratio greater than 1.36 approximately corresponds to a drunken state in which the blood alcohol concentration of the test subject person exceeds 0.03%.

In the first embodiment, the control unit 7 compares the calculated waveheight ratio with the criterial waveheight ratio at step S153 in the flowchart of FIG. 10. In a case where the first wavelength of the light is 870 nm and the second wavelength of the light is 1300 nm, the control unit 7 can use a constant value (for example, 1.36) as the criterial waveheight ratio.

The control unit 7 may memorize the data of the criterial waveheight ratio in the flash memory for each driver of the vehicle. In this case, for each driver who has chances to drive the vehicle, the relation between the waveheight ratio of the pulse waves and the blood alcohol concentration as shown in FIG. 14 is obtained in advance by experiment. Then, based on the obtained information of the relation between the waveheight ratio of the pulse waves and the blood alcohol concentration, the criterial waveheight ratio, which acts as a threshold between the drunken state and a normal state, is determined. The determined criterial waveheight ratio is memorized in the flash memory of the control unit 7 in advance in association with the identification information of the driver.

In the first embodiment, the control unit 7 determines the blood alcohol concentration from the calculated waveheight ratio at step S157 in the flowchart of FIG. 10. In the case where the first wavelength of the light is 870 nm and the second wavelength of the light is 1300 nm, the control unit 7 may use the relationship shown in the graph of FIG. 14 as it is as the information of the relation between the waveheight ratio of the pulse waves and the blood alcohol concentration.

The control unit 7 may memorize the relation between the waveheight ratio of the pulse waves and the blood alcohol concentration for each driver of the vehicle in the flash memory. In this case, for each driver who has chances to drive the vehicle, the relation between the waveheight ratio of the pulse waves and the blood alcohol concentration is obtained in advance by experiment. Then, the obtained information of the relation between the waveheight ratio of the pulse waves and the blood alcohol concentration is memorized in the flash memory of the control unit 7 in advance in association with the identification information of the driver.

Second Embodiment

Figure 15:
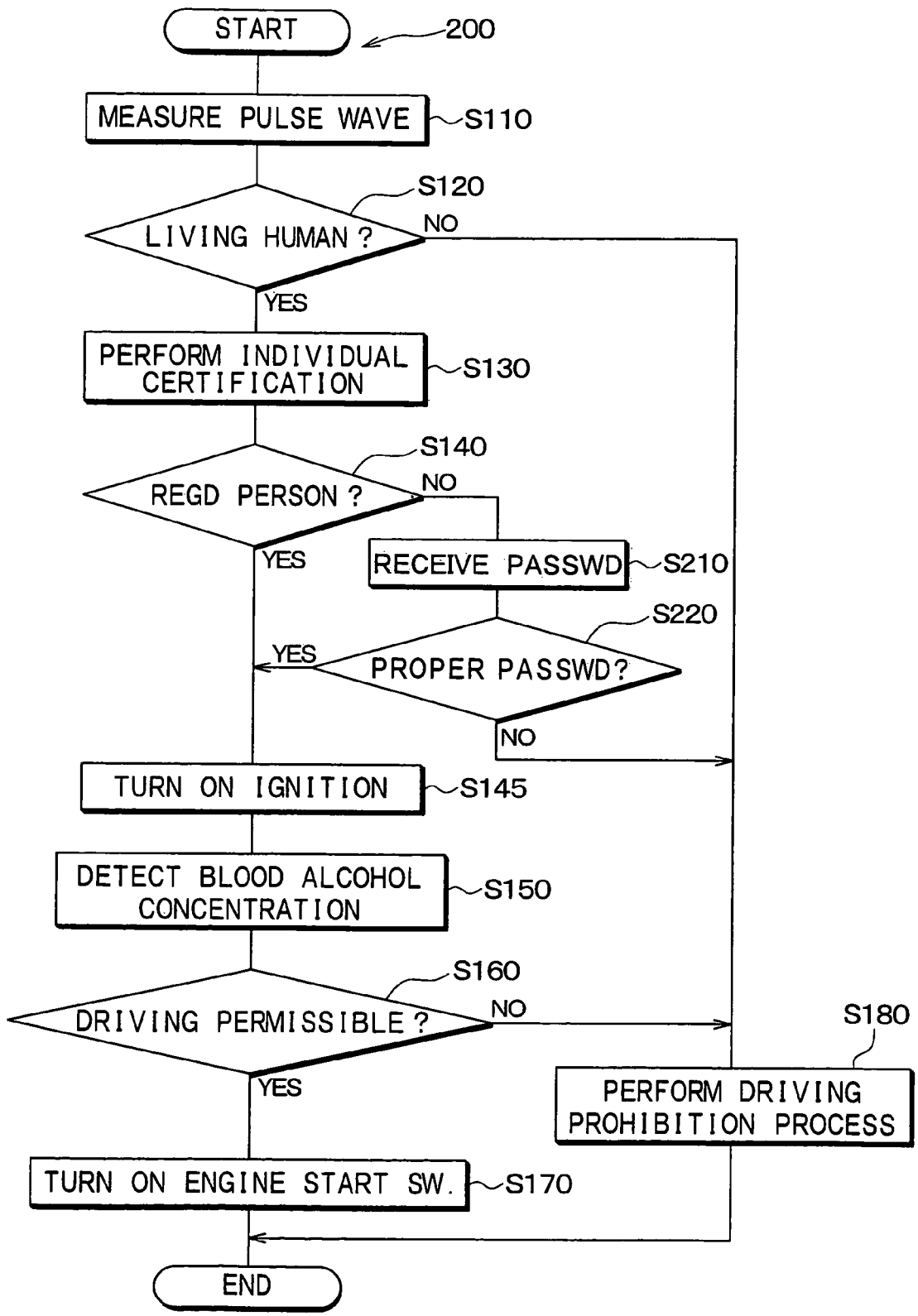
FIG. 15 is a flowchart of a program performed by a control unit of an engine starting controller according to a second embodiment of the present invention.

A second embodiment of the present invention will be described hereafter. The second embodiment is different from the first embodiment where the control unit 7 executes a program 200 shown in FIG. 15 instead of the program 100 shown in FIG. 7. Steps to which the same referential numeral is assigned across FIGS. 7, 15 perform the same process, and are not repeatedly described hereafter.

In executing the program 200, if it is determined at step S140 that the finger is not a properly registered person's finger, the control unit 7 performs a process for receiving an input of a password at step S210 that follows the step S140. Specifically, the control unit 7 controls the display device 6 to display a prompt that prompts an input of a password, and waits for the input of the password from the input device 5.

When the password is inputted by the driver, it is determined at step S220 whether the inputted password is a proper password or not. Specifically, the inputted password is compared with the proper password that is recorded in the flash memory. If the inputted password agrees with the proper password, it is determined that the inputted password is proper, and the process proceeds to step S145. Otherwise, it is determined that the inputted password is not proper, and the process proceeds to step S180.

The proper password is recorded in the flash memory by the following methods, for example. First, an authorized driver of the vehicle operates the input device 5 to resister a password. The control unit 7 waits for an input of the password in response to the driver's operation for registering a password. When the driver inputs a password through the input device 5, the control unit 7 records the inputted password in the flash memory as the proper password.

In this manner, when it is determined that the driver of the vehicle is not a properly registered driver based on the vein pattern image of the finger 50 taken by the camera 41, the control unit 7 determines at steps S210, S220 whether the password inputted by the driver is a proper password or not.

Then, the control unit 7 permits engine start of the vehicle at step S170 when it is determined that the password is a proper password and it is determined that the detected index value of the blood alcohol concentration does not exceed the criterial value of alcohol drinking (see steps S150, S160).

By executing such a means for avoiding the individual certification by verifying a password, a driver who is not an authorized driver yet is permitted to drive the vehicle by the authorized driver and is informed of the password from the authorized driver can start the engine of the vehicle by inputting the password even if the individual certification with the vein pattern image of the finger 50 has failed, unless the index value of the blood alcohol concentration of the driver exceeds the criterial value of alcohol drinking.

Third Embodiment

A third embodiment of the present invention will be described hereafter. The third embodiment is different from the first embodiment where the control unit 7 further executes a program 300 shown in FIG. 16. The program 300 is a program for calculating an amount of autonomic nerve activity of a driver with the optical detector unit 4, and notifying information based on the calculation result to the driver.

The control unit 7 may start executing the program 300 at the same timing as the program 100. In this manner, if the driver only places the finger 50 in the depressed portion 40a, 40b of the optical detector unit 4 once, it is possible to perform a calculation of the amount of autonomic nerve activity of the driver in addition to the engine starting control based on the individual certification of the driver and the detection of the blood alcohol concentration of the driver.

In executing the program 300, firstly at step S310, the control unit 7 measures the pulse wave signal in the fingertip of the finger 50 placed on the detection window 40b for a predetermined time (for example, 32 seconds or longer). Next, at step S320, a peak or a bottom of the measured pulse wave signal is detected. Furthermore, at step S330, the control unit 7 calculates a pulse interval of each pulse (that is, a pulse interval of each wave in the pulse wave signal) based on intervals between the tops or between the bottoms.

The processes at steps S310-S330 are performed in the same way as step S110 in the flowchart of FIG. 7. At steps S310-S330, the light emitting elements group 42 may irradiate the finger 50 with either the light having the first wavelength or the light having the second wavelength. Instead of executing the processes at steps S310-S330, the control unit 7 may merely read out the pulse intervals recorded at step S110 in the flowchart of FIG. 7.

Figure 17:
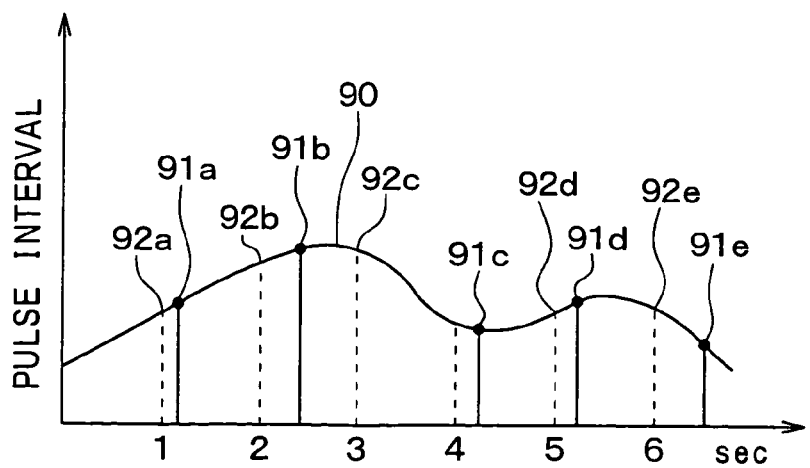
FIG. 17 is a graph showing interpolation processes for calculating pulse intervals per unit time.

Next, at step S340, the control unit 7 calculates fluctuations of the pulse interval per unit time (specifically per one second) based on the obtained data of the pulse interval of each pulse. In this calculation, an interpolation process such as spline interpolation is used. Specifically, as shown in FIG. 17, the obtained data 91a-91e of the pulse interval of each pulse is plotted so as to leave an interval in a direction of a time axis as much as a length of the pulse interval. The plots of the data 91a-91e are connected by a line 90 with an interpolation process such as spline interpolation. Then, by using the line 90, the data 92a-92e of the pulse interval per unit time is obtained.

Then, at step S350, a frequency analysis of the data 92a-92e of the pulse intervals per unit time (for example, data of 32 pulse intervals per one second), which is obtained as described above, is performed with FFT (fast Fourier transform). Accordingly, it is possible to obtain characteristic information of a frequency component of the fluctuations of the pulse intervals.

Then, at step S360, among the frequency components of the fluctuations of the pulse intervals, a peak value $P_{LF}$ in a low frequency band (0.04 Hz-0.15 Hz) and a peak value $P_{HF}$ in a high frequency band (0.15 Hz-0.4 Hz) are calculated.

Then, at step S370, the amount of autonomic nerve activity is calculated based on the calculated peak values $P_{LF}$, $P_{HF}$. It is known that the value $P_{LF}$ is a quantity reflecting variations of amounts of sympathetic nerve activity and parasympathetic nerve activity and that the value $P_{HF}$ is a quantity reflecting the amount of parasympathetic nerve activity, which acts as a brake of the autonomic nerve activity.

Therefore, if an amount of autonomic nerve activity such as $P_{LF}/(P_{LF}+P_{HF})$ and $P_{LF}/P_{HF}$ is greater than a reference range, it is determined that the driver is in a strained or excited state. If the amount of autonomic nerve activity is smaller than the reference range, it is determined that the driver may be dozing.

The reference range is an ordinary range of the amount of autonomic nerve activity, and is registered in advance. There are individual differences in the ordinary range of the amount of autonomic nerve activity. In addition, the same person's amount of autonomic nerve activity changes in accordance with the person's age. Therefore, the reference range of each driver of the vehicle is registered in advance in the flash memory.

That is, pairs of the identification information of the driver (name, identification code, etc.) and the reference range of the amount of autonomic nerve activity of the driver are recorded in the flash memory. When the execution of the program 300 is started, the control unit 7 reads out the reference range, which is paired with the identification information of the driver inputted by the driver through the input device 5, from the flash memory. Then, the control unit 7 uses the read reference range at step S370 as the reference range of the driver.

The reference range is registered in the flash memory by the following methods, for example. First, an authorized driver of the vehicle places his/her finger 50 in the depressed portion 40a, 40b of the case 40. Then, the authorized driver operates the input device 5 to register his/her reference range and to input his/her identification information (name, identification code, etc.).

Figure 16:
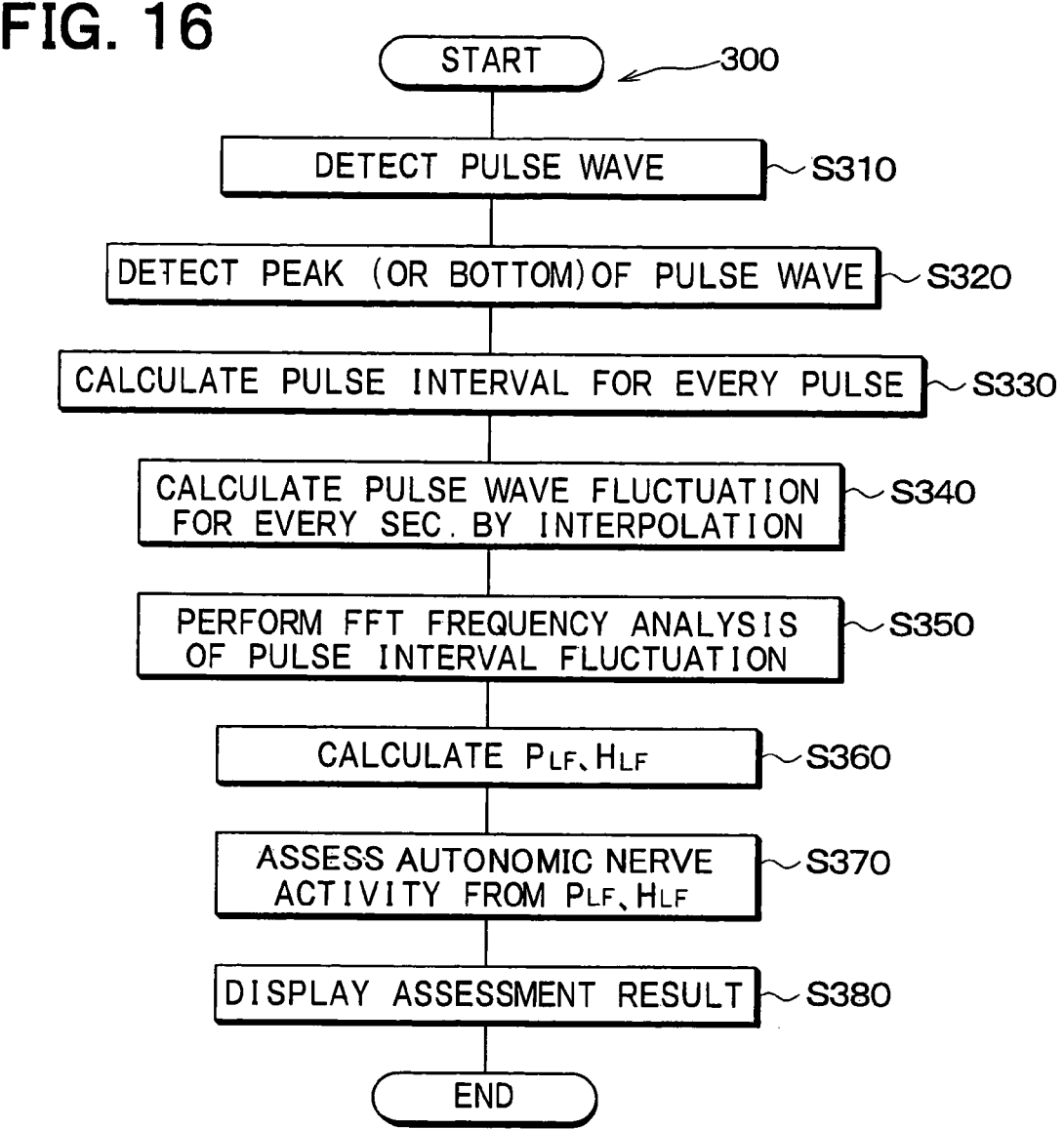
FIG. 16 is a flowchart of a program performed by a control unit of an engine starting controller according to a third embodiment of the present invention.

In response to the operation for registering the reference range, the control unit 7 repeats the processes at steps S310-S360 in the flowchart of FIG. 16 two or more times, so as to calculate the amount of autonomic nerve activity two or more times at first time intervals. Then, the control unit 7 records the calculated result in the flash memory as the amount of autonomic nerve activity associated with the inputted identification information. Such recordings of the amount of autonomic nerve activity, which are performed when the authorized driver operates the input device 5 to register his/her reference range, are referred to as events hereafter.

Then, the control unit 7 calculates a mean value M and a standard deviation σ of the amount of autonomic nerve activity of the driver from two or more values of the amount of autonomic nerve activity, which are recorded in one or more events for each driver. A range between M−f(σ) and M+f(σ) is the reference range. Here, f(σ) is a positive value that increases as σ increases. For example, it is possible to use 3σ as f(σ).

The above-mentioned events may be repeated for the same driver at second time intervals. The second time interval is much longer (for example, 100 times longer) than the first time interval. For example, the events may be performed once a day and repeated for several days. In this manner, it is possible to accurately reflect the reference range of each driver.

The control unit 7 may determine the reference range of a driver from the recorded amount of autonomic nerve activity of the driver when the events for the driver are performed predetermined repetition times.

The control unit 7 may determine the reference range of the amount of autonomic nerve activity of the driver based on the driver's age, until the events for the driver are performed predetermined repetition times. In this case, data that associates an age and an ordinary range (that is, the reference range) of the amount of autonomic nerve activity of an average person having the age is recorded in the ROM or the flash memory of the control unit 7. In executing the program 300, an age that corresponds to the inputted identification information of the driver is identified. Then, the reference range that corresponds to the identified age is retrieved from the data that associates the age and the ordinary range of the amount of autonomic nerve activity of an average person. The identified reference range is used at step S370 as the reference range of the amount of autonomic nerve activity of the driver.

The control unit 7 may identify the age that corresponds to the identification information as follows. First, the control unit 7 records the identification information and date of birth of the driver having the identification information to be associated with each other in the flash memory in advance. Based on the current time and the date of birth that corresponds to the identification information, the age of the driver corresponding to the identification information is identified. The control unit 7 records the information of date of birth of the driver corresponding to the identification information in response to the driver's input operation of the date of birth through the input device 5.

Next, at step S380, assessment result of the amount of autonomic nerve activity at step S370 is notified to the driver through the display device 6. If it is determined at step S370 that the driver is in a strained or excited state, a voice that advises the driver to become relaxed is outputted from the display device 6, for example. If it is determined at step S370 that the driver may be dozing, a loud voice for awakening the driver is outputted from the display device 6, for example.

At step 380, the amount of autonomic nerve activity, which is calculated at step S360, may be recorded in the flash memory in association with current date information. In this case, the control unit 7 may display the recorded amount of autonomic nerve activity on the display device 6 in response to a driver's operation of the input device 5 for requesting display of the amount of autonomic nerve activity.

In this manner, the pulses are detected from the pulse wave signal, and the amount of autonomic nerve activity is calculated from the pulse intervals. Then, it is possible to call attention of the driver based on the amount of autonomic nerve activity. Moreover, by recording and displaying the amount of autonomic nerve activity as daily physical condition information of the driver, the driver can use the amount of autonomic nerve activity for daily health check.

Other Embodiments

Several embodiments of the present invention have been described above. However, the scope of the present invention should not be limited to the above-described embodiments, but includes various modes that realize the effects of the features of the invention.

In the above-described embodiments, the fingertip is used as the detection part. However, the detection part may be other parts of the human body (for example, a palm).

In the above-described embodiments, the waveheight ratio between the waveheight of the pulse wave signal in response to the light having the first wavelength and the waveheight of the pulse wave signal in response to the light having the second wavelength is used as the index value of the blood alcohol concentration. However, a value based on waveheights of pulse wave signals in response to three or more kinds of lights, of which wavelengths differ from each other, may be used as the index value of the blood alcohol concentration.

In the above-described embodiments, the first wavelength is 870 nm, and the second wavelength is 1300 nm. However, the first wavelength and the second wavelength are not limited to these lengths. Specifically, as long as the waveheight of the pulse wave signal in response to the light having the first wavelength is changed by blood alcohol concentration more sensitively than the waveheight of the pulse wave signal in response to the light having the second wavelength, the first wavelength and the second wavelength may be any lengths.

In the driving prohibition process (at step S180), if a key is inserted in a key cylinder of the vehicle and is set at an engine starting position, the engine may be started by controlling the engine start switch 3.

In the above-described embodiments, the control unit 7 realizes the individual certification by taking a vein pattern image in the fingertip with the camera 41 and comparing the taken vein pattern image with registered vein patterns. Alternatively, the individual certification may be realized by taking a fingerprint of a fingertip with the camera 41 and comparing the taken fingerprint pattern with registered fingerprint patterns.

In the above-described embodiments, each function is realized by executing a program by the control unit 7. Alternatively, it is also possible to realize the function with a hardware having the function (for example, a FPGA of which circuit configuration is programmable).

Additional advantages and modifications will readily occur to those skilled in the art. The invention in its broader terms is therefore not limited to the specific details, representative apparatus, and illustrative examples shown and described.

What is claimed is:

1. An engine starting controller mounted on a vehicle, comprising:
    a sensor for detecting a pulse of a driver of the vehicle at a detection part of a body of the driver with an optical method, and taking an image of the detection part;
    a case in which the sensor is installed;
    an individual certification means for determining whether the driver of the vehicle is an authorized person or not based on the image of the detection part taken by the sensor;
    an alcohol concentration determiner for calculating an index value of a blood alcohol concentration of the driver based on the pulse detected at the detection part by the sensor, and determining whether the index value exceeds a criterial value of a drinking assessment or not; and
    a permission means for permitting the driver to start an engine of the vehicle when it is determined by the individual certification means that the driver of the vehicle is the authorized person and it is determined by the alcohol concentration determiner that the index value does not exceed the criterial value of the drinking assessment,
    wherein the sensor is configured to detect the pulse of the driver at the detection part and to take the image of the detection part when the driver brings the detection part close to the case;
    the detection part is a finger of the driver of the vehicle;
    the case has a depressed portion configured to support the finger of the driver;
    the sensor includes a light emitting element for emitting a light, a camera for taking the image of a vein pattern of the detection part with the light that is emitted from the light emitting element and has passed through the detection part, and a light receiving element for taking an intensity of the light that is emitted from the light emitting element and has passed through the detection part; and
    the light receiving element is configured to be located closer to a distal end of the finger placed in the depressed portion than the camera.

2. The engine starting controller according to claim 1, wherein:
    the individual certification means determines whether the detection part is a living human's body part based on the pulse detected at the detection part by the sensor; and
    the individual certification means determines whether the driver of the vehicle is the authorized person or not on a condition that the detection part is determined to be the living human's body part.

3. The engine starting controller according to claim 1, wherein:
    the individual certification means determines whether a password inputted by the driver of the vehicle is a proper password or not when the driver of the vehicle is determined not to be the authorized person based on the image of the detection part taken by the sensor; and
    the permission means permits the driver to start the engine of the vehicle when it is determined by the individual certification means that the password is the proper password and it is determined by the alcohol concentration determiner that the index value does not exceed the criterial value of the drinking assessment.

4. The engine starting controller according to claim 1, further comprising:
    an autonomic nerve activity calculator for calculating an amount of an autonomic nerve activity of the driver based on the pulse detected at the detection part by the sensor; and
    an autonomic nerve activity notification means for notifying an information based on the amount of the autonomic nerve activity calculated by the autonomic nerve activity calculator.

* * * * *